UNITED STATES PATENT OFFICE.

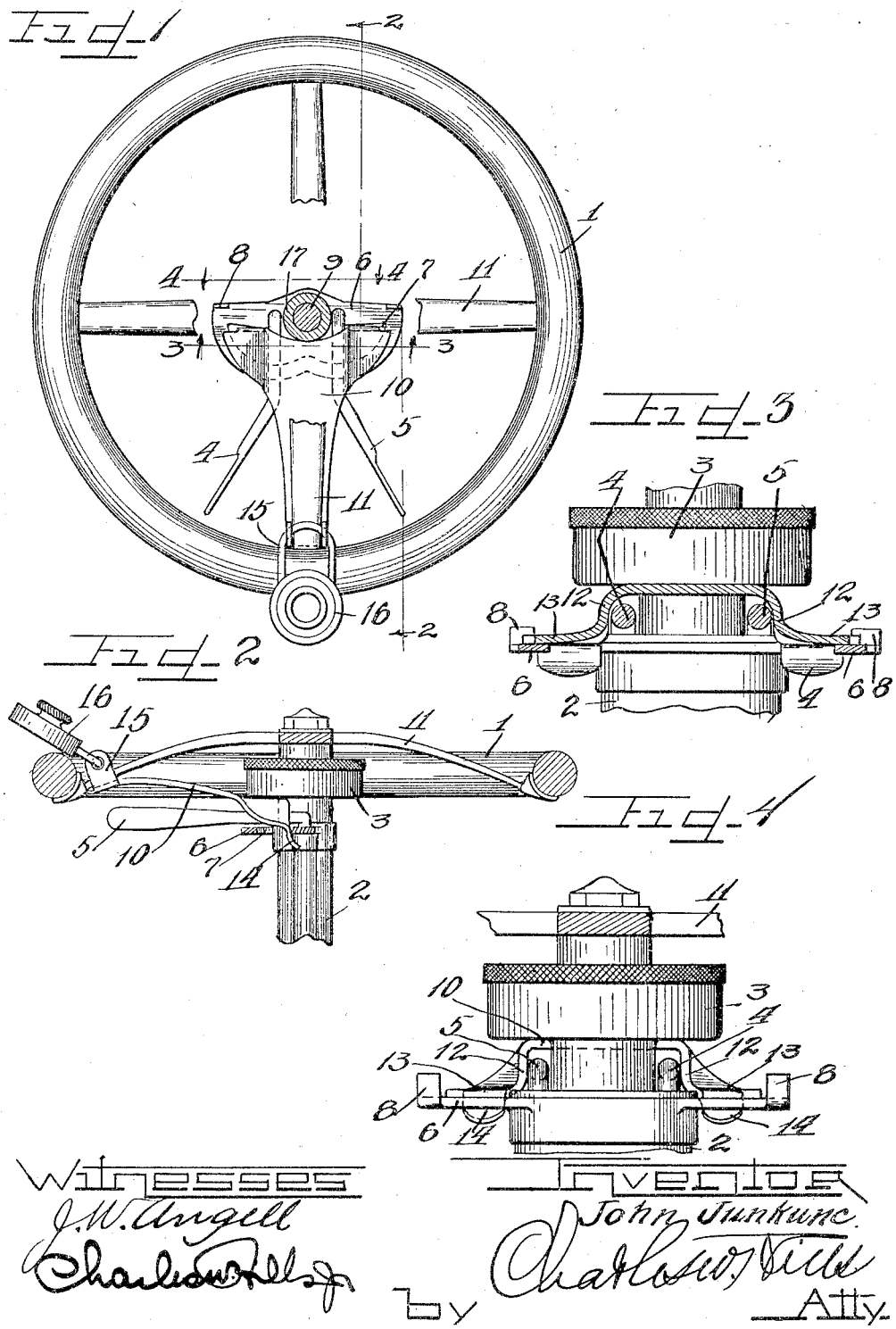

JOHN JUNKUNC, OF CHICAGO, ILLINOIS.

AUTOMOBILE-LOCK.

1,326,404.　　　　　Specification of Letters Patent.　　Patented Dec. 30, 1919.

Application filed March 10, 1919.　Serial No. 281,715.

*To all whom it may concern:*

Be it known that I, JOHN JUNKUNC, a citizen of the United States, and a resident of the city of Chicago, in the county of Cook and State of Illinois, have invented certain new and useful Improvements in Automobile-Locks; and I do hereby declare that the following is a full, clear, and exact description of the same, reference being had to the accompanying drawings, and to the numerals of reference marked thereon, which form a part of this specification.

This invention relates to automobile locks adapted to prevent theft of cars by locking essential portions of the mechanism.

In devices of this kind commonly used, it has been necessary to reconstruct or specially design a portion of the car to accommodate the lock and consequently such devices are not adapted for application to cars originally constructed without such safety devices.

My invention is designed to avoid this difficulty.

It is an object, therefore, of my invention to provide an automobile locking device which may be immediately applied to a car without changing or replacing any of the original parts.

A further object of my invention is to provide means for locking the steering wheel and also the spark and throttle levers to prevent either the operation of the engine or towing away of the car by a second car.

My invention also has other objects which will appear from the disclosures in the drawings and specification.

The invention (in a preferred form) is illustrated in the drawings and hereinafter more fully described.

On the drawings:

Figure 1 is a plan view of an automobile steering wheel with a lock embodying my invention in position thereon.

Fig. 2 is a section on the line 2—2 of Fig. 1.

Fig. 3 is a section on the line 3—3 of Fig. 1.

Fig. 4 is a section on the line 4—4 of Fig. 1.

As shown in the drawings:—

The reference numeral 1, designates a steering wheel mounted on a steering column 2, and connected to the steering post 9, by planetary gearing located in the casing 3. Spark and throttle levers 4 and 5 are provided adapted to operate rods in the steering column in the usual way. These levers are arranged to swing in arcs over a quadrant plate 6, formed with an aperture 7. The outer movement of the levers 4 and 5, is limited by upstanding projections 8, at the rear edge of the quadrant plate 6, so that the levers cannot move off the quadrant.

When the levers 4 and 5, are locked in the position shown in Fig. 1, the engine cannot be operated satisfactorily, and according to my invention, means are provided for releasably locking the levers in this position. For this purpose, a specially formed plate 10, may be employed, preferably of hardened steel to prevent its cutting, bending or distortion by tools of any kind.

The central portion of this plate is arranged to rest on the inner ends of the levers 4 and 5, under the spokes 11, of the steering wheel, with its rear edge 17, under the planetary gear case 3. On each side of this central portion, the plate 10, is downwardly and outwardly flanged, as shown in Fig. 3, so as to provide shoulders 12, which engage the sides of the levers 4 and 5, and wings 13, which rest on the quadrant 6.

The rear margins of these wings are turned downwardly to form projections 14, which can be inserted through the aperture 7, in the quadrant 6.

The opposite end of the plate 10, is formed with lateral upwardly directed perforated extensions 15, spaced apart substantially the width of one of the spokes 11, so that by means of a suitable lock 16, passed through the apertures in these extensions 15, the plate 10, may be locked to the outer end of one of these spokes.

Lateral movement of the plate 20, is prevented by the extensions 15, at one end and by the projections 14, engaging the aperture 7, in the quadrant at the other end.

Longitudinal movement of the plate 10, is prevented in one direction by the engagement of the extensions 15, with the rim of the steering wheel 1, and in the other direction by the projections 14, engaging the rear wall of the aperture 7, in the quadrant. Vertical movement of the plate is prevented at one end by the spoke 11, of the steering wheel and at the other by the engagement of the rear edge 17, of the plate under the underside of the planetary casing 3. The plate 10, is therefore locked in place so that it cannot be disengaged until the lock 16, is detached when the adjacent end of the plate 10, may be dropped sufficiently to allow the projections 15, to pass under the rim of the wheel 1, as the plate is moved forwardly to disengage the projections 14.

This forward movement of the plate 10, brings its rear edge 17, out of engagement with the underside of the planetary casing 3, so that the rear end of the plate may be lifted sufficiently to disengage the projections 14, from the slot 7.

The plate is then entirely clear of the steering wheel and the levers 4 and 5, and may be placed in the tool bag or other convenient receptacle.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. An automobile lock comprising a plate having a central portion adapted to rest on the spark and throttle levers, downwardly flanged lateral portions adapted to engage the sides of these levers and prevent their lateral movement, portions extending outwardly from the bottom of said flanged portions adapted to rest on the quadrant, downwardly directed projections on said outwardly extending portions for engagement with apertures in the quadrant, and a pair of upwardly directed lateral projections adapted to engage opposite sides of the spokes of a steering wheel, and means for releasably locking the last mentioned projections in engagement with such spoke.

2. An automobile lock comprising a plate having a substantially flat central portion adapted to rest on the spark and throttle levers, downwardly flanged lateral portions adapted to engage the sides of these levers and prevent their lateral movement, projections on the plate adapted to engage the quadrant, vertical projections on the plate adapted to engage opposite sides of the outer end of one of the spokes of the steering wheel, and means for releasably locking the last mentioned projections in engagement with such spoke.

In testimony whereof I have hereunto subscribed my name in the presence of two subscribing witnesses.

JOHN JUNKUNC.

Witnesses:
EARL M. HARDINE,
LAWRENCE REIBSTEIN.